United States Patent
Chowdhury et al.

(10) Patent No.: US 7,315,545 B1
(45) Date of Patent: Jan. 1, 2008

(54) METHOD AND APPARATUS TO SUPPORT DIFFERENTIAL INTERNET DATA PACKET TREATMENT IN A BASE STATION CONTROLLER

(75) Inventors: Kuntal Chowdhury, Plano, TX (US); Mini Vasudevan, Richardson, TX (US)

(73) Assignee: Nortel Networks Limited, St. Laurent, Quebec (CA)

( * ) Notice: Subject to any disclaimer, the term of this patent is extended or adjusted under 35 U.S.C. 154(b) by 995 days.

(21) Appl. No.: 10/113,974

(22) Filed: Mar. 29, 2002

(51) Int. Cl.
H04L 12/28 (2006.01)

(52) U.S. Cl. .................... 370/395.4; 370/389

(58) Field of Classification Search ........... 370/229, 370/235, 310.2, 328, 338, 348, 386, 395.4, 370/395.42, 395.43, 395.5, 395.52, 401, 370/411, 310, 349, 352–358, 389, 395.41, 370/402, 429, 412
See application file for complete search history.

(56) References Cited

U.S. PATENT DOCUMENTS

| 6,947,756 | B2 * | 9/2005 | Khan et al. ............. 455/456.5 |
| 2002/0083203 | A1 * | 6/2002 | Lim ........................ 709/246 |

FOREIGN PATENT DOCUMENTS

| EP | 1 059 792 A2 | 12/2000 |
| EP | 1 150 523 A2 | 10/2001 |

OTHER PUBLICATIONS

3GPP2: "Interoperability Specification (IOS) for CDMA 2000 Access Network Interfaces—Part 2 Transport," 3rd Generation Partnership Project 2 "3GPP2", Online! Oct. 2002, Retrieved from the Internet: <URL:http://www.3gpp2.org/Public_html/specs/A.S0012-A_v1.0.pdf> retrieved on Mar. 14, 2003.

Sengodan, S. et al, "Impact of Different Cellular-IP Convergence Strategies on Mobile Terminals," 2000 IEEE International Conference on Personal Wireless Communications; Conference Procee3dings (Cat. No. 00th8488), Proceedings of IEEE International Conference on Personal Wireless Communications (ICPWC), Hyderbad, India, Dec. 20, 2000.

* cited by examiner

Primary Examiner—Brenda Pham
(74) Attorney, Agent, or Firm—Carr LLP

(57) ABSTRACT

A method and an apparatus are disclosed for providing the order of transmission of radio link packets of various flows by the outer DSCP markings contained in correlated IDPs. This is achieved by a BSC sorting the IDPs by their associated outer DSCP marking and placing the IDP into a BSC memory as a function of the outer DSCP marking, and then scheduling the IDPs on the basis of in which BSC memory they have been placed.

8 Claims, 6 Drawing Sheets

Nodal Analysis

METHOD AND APPARATUS TO SUPPORT DIFFERENTIAL INTERNET DATA PACKET TREATMENT IN A BASE STATION CONTROLLER

TECHNICAL FIELD

The invention relates generally to wireless communications systems and, more particularly, to a method and an apparatus in which a base station controller delivers Internet data packets of a service instance according to priority.

BACKGROUND

In the Internet and other related networks, data packets are routed through gates and routers based upon a variety of criteria. In the case of the Internet, one of these criteria is based upon a Diffserv Code Point ("DSCP") header or markings defined by the Differentiated Services protocols, found in the header of an Internet data packet ("IDP"). Differentiated Services protocols manage IDPs based on the traffic's "class of service". A class of service is generally formed by grouping similar types of traffic (for example, e-mail, streaming video, voice, large document file transfer) together and treating each type as a class with its own level of service priority.

Wireless communication of IDPs is typically accomplished by a base station controller ("BSC") converting the IDPs of a given "service instance" from general routing encapsulation ("GRE"), which has been performed by a Packet Data Servicing Node ("PDSN"), into a radio link protocol ("RLP") format as Radio data packets ("RDPs"). As is understood, a service instance is generally defined as an instantiation of a service option between a radio network and a mobile station ("MS"), in which dedicated radio resources are allocated for providing wireless service. The RDPs are then transmitted to a base transceiver station ("BTS"), and from there, to the MS.

However, when the BSC extracts the IDPs from GRE format and then converts the IDPs to RDPs in RLP format, the DSCP markings within the IDP headers are ignored. Thus, converting IDPs to RDPs in RLP format fails to employ the information contained within the DSCP markings within the headers of the IDPs. Multiple IDPs of the same service instance, but which also have differing DSCP markings, are therefore output by the BSC as a corresponding RLP instance but with no regard to their DSCP markings.

Therefore, there is a need for a method and an apparatus for employing the information contained within the DSCP markings of IDPs that overcomes the shortcomings of conventional systems.

SUMMARY

The present invention provides a method and an apparatus in which a BSC classifies an IDP according to its associated indicia. After classification, the BSC then places the IDP in an appropriate BSC memory.

In a further aspect, after classification, the IDP is then scheduled by a scheduler as a function of its associated BSC memory.

In a further aspect, a PDSN creates the outer DSCP markings. In another aspect, the associated indicia comprise outer DSCP markings.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

In the following discussion, numerous specific details are set forth to provide a thorough understanding of the present invention. However, those skilled in the art will appreciate that the present invention may be practised without such specific details. In other instances, well-known elements have been illustrated in schematic or block diagram form in order not to obscure the present invention in unnecessary detail. Additionally, for the most part, details concerning network communications, electro-magnetic signalling techniques, and the like, have been omitted inasmuch as such details are not considered necessary to obtain a complete understanding of the present invention, and are considered to be within the understanding of persons of ordinary skill in the relevant art.

It is further noted that, unless indicated otherwise, all functions described herein may be performed in either hardware or software, or some combination thereof. In a preferred embodiment, however, the functions are performed by a processor, such as a computer or an electronic data processor, in accordance with code, such as computer program code, software, and/or integrated circuits that are coded to perform such functions, unless indicated otherwise.

Figure 1:
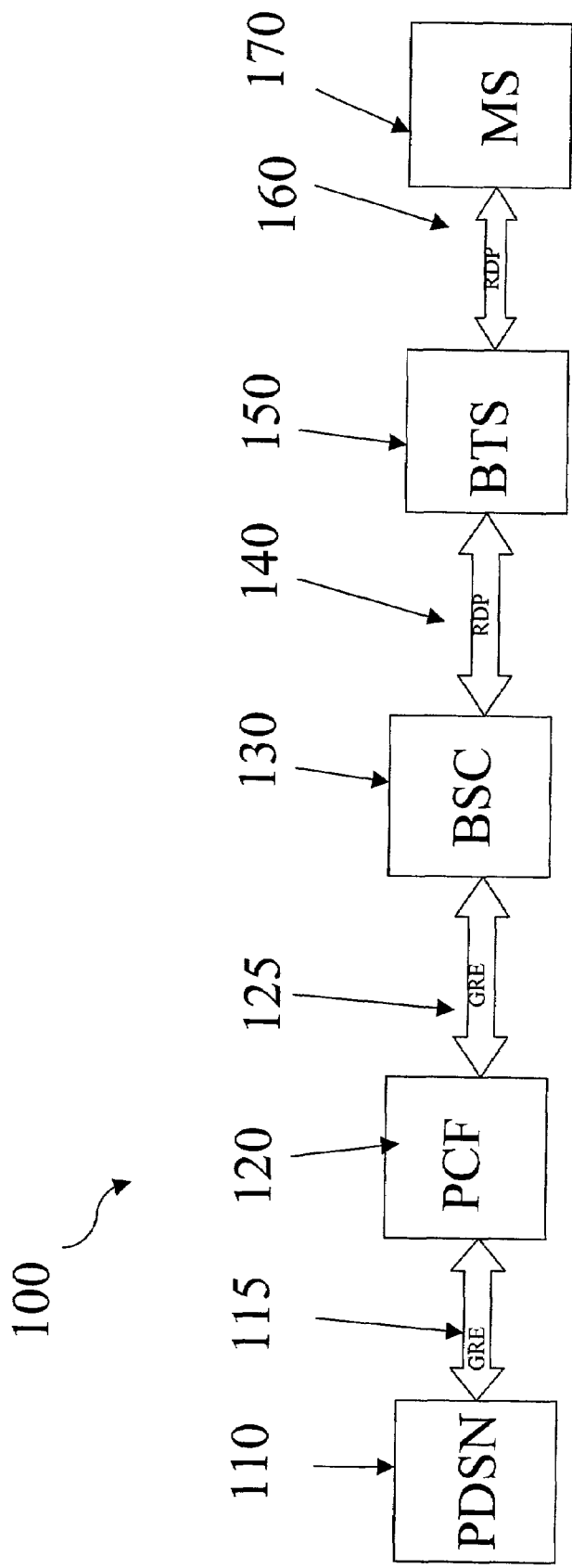
FIG. 1 schematically depicts a wireless communications network.

Referring to FIG. 1, the reference numeral 100 generally designates a wireless communications system that embodies features of the present invention. Generally, a BSC 130 of the wireless communications system 100 employs indicia, such as DSCP markings in an outer IP header ("outer" DSCP markings), to determine an order of transmission. Typically, the "outer" DSCP markings are a copy of a six-bit field in the Internet Protocol ("IP") header which specifies the per hop behavior ("PHB") for an IDP (that is, the "inner" DSCP markings"), copied on to the outer IP header. Generally, the PHB is a way of expressing how to forward a given IDP through various Internet resources based upon certain rules. The PHB of an IDP corresponds to one of 64 possible "forwarding behaviors". Typically, in the wireless communications system 100, outer DSCP markings of IDPs aid the BSC 130 in classifying the IDP before it is scheduled and converted to a RDP for transmission to a BTS 150. The BTS 150 then transmits these RDPs to the MS 170 in the scheduled order over a forward radio link.

A "flow" typically comprises a plurality of IDPs having the same PHB, which also correlates to the same class of service. A flow is generally defined as a data stream transmitted from one separate application to another application, or from one host to another host. On such example of a flow is the data stream between an application running on a host on the Internet and an application running on an MS 170. These applications may be software, hardware, firmware, or other devices.

An "input flow" is generally defined as a flow received by the BSC 130. An "output flow" is generally defined as a flow transmitted by the BSC 130. It is understood, however, that the BSC 130 employs the IDPs, and is not concerned with the membership of an IDP in a given flow. An output flow of a BSC 130 typically corresponds to an input flow of IDPs that has had both the GRE header and the outer Internet protocol header ("IP header") removed, and then converted into RDPs in RLP format. A given input flow received from the Internet will have a specific inner DSCP marking associated with its component IDPs, and therefore the given flow will have a specific outer DSCP marking as well. A flow or plurality of flows comprising a single service instance is output by the BSC 130 as a single RLP instance. However, in a further embodiment, a plurality of service instances are encountered by the BSC 130 when, for instance, the MS 170 sends and receives both voice-over IP data and telnet hypertext transfer protocol ("HTTP") data.

In FIG. 1, the wireless communications system 100 is operationally coupled to the Internet (not shown) through a Packet Data Servicing Node (PDSN) 110. The PDSN 110 typically acts as the point of entry between the Internet and the wireless communications system 100. The PDSN 110 encapsulates the IDPs into GRE format. The PDSN 110 also copies the DSCP markings from the IDP, (the "inner" DSCP markings) onto an outer IP header (the "outer" DSCP markings). In further aspects of the present invention, the DSCP does not directly copy the inner DSCP markings to the outer IP header, and other mapping functions are instead used. Generally, the outer DSCP markings are employed by the BSC 130 for classifying the IDPs by priority. From the PDSN 110, IDPs, in GRE encapsulation and with an outer IP header comprising outer DSCP markings, are transmitted through a bus 115 to a packet control function ("PCF") 120.

The PCF 120 is generally defined as an entity that manages the relay of data packets, such as IDPs, between a Base Station and the PDSN 110. As is well understood, the bus 115 typically comprises two separate logical paths between the PDSN 110 and the PCF 120. The two separate logical paths are the A10 interface and the A11 interface. Generally, the A10 interface is used to provide a path for user traffic between the PCF 120 and the PDSN 110 for data packets, such as IDPs. The A11 interface is used to provide a signalling connection between the PCF 120 and the PDSN 110. The theory and use of the A10 and the A11 interfaces are understood, and therefore shall not be described in further detail. From the PDSN 110, the IDPs, in GRE format, are then transmitted through a bus 125 to a BSC 130.

IDPs transmitted through the bus 125 typically travel through two separate logical paths between the PCF 120 and the BSC 130. The two separate logical paths are the A8 interface and the A9 interface. Generally, the A8 interface is used to provide a path for user traffic between the PCF 120 and the BSC 130 for data packets, such as IDPs, and the A9 interface is used to provide a signalling connection between the PCF 120 and the BSC 130. The theory and use of the A8 and the A9 interfaces are well known to those of skill in the art, and therefore shall not be described in further detail.

Once the IDPs are transmitted to the BSC 130 from the PCF 120, the IDPs are then classified by the BSC 130 according to their corresponding outer DSCP markings, and then each IDP is placed in the appropriate memory, such as a BSC buffer. After being classified and placed in the appropriate memory by the BSC 130, the IDPs are then scheduled for transmission. After scheduling, the outer IP header and GRE encapsulation are removed, and then the IDPs are converted into RDPs in RLP format, and then transmitted as an RLP service instance by the BSC 130 over the bus 140 to the BTS 150. The BTS 150 then transmits these RDPs over the forward link 160 for reception by an operationally linked MS 170.

In the wireless communication systems 100, it is advantageous to classify the different IDPs of a given service instance by their priority levels before the scheduling of the transmission of the corresponding RDPs as an RLP instance. Classifying by the IDPs by priority, and then scheduling the IDPs, allows higher priority converted RDPs in RLP format to be transmitted by the BSC 130 before lower priority RDPs in RLP format are transmitted by the BSC 130.

In a further embodiment, output flows comprising IDPs with higher priority outer DSCP markings are transmitted by the BSC 130 before output flows comprising IDPs with lower priority output DSCP markings, as a function of the outer DSCP markings of the IDPs.

In a further embodiment, the BSC 130 receives an RLP instance from the MS 170. The RDPs of the RLP have been "marked" by a previous node, such as the BTS 150, which is functionally equivalent to having an outer IP header comprising an outer DSCP marking appended to the RDP. The RDPs are first converted to IDPs, and then the BSC 130 organizes by priority by classifying the IDPs by the functional equivalent of an outer DSCP marking, encapsulates them in a GRE header, and transmits them to the PCF 120 through bus 125. When the PDSN 110 receives the IDPs, it strips the GRE header from the IDP before transmitting the IDP onto the Internet.

Figure 2:
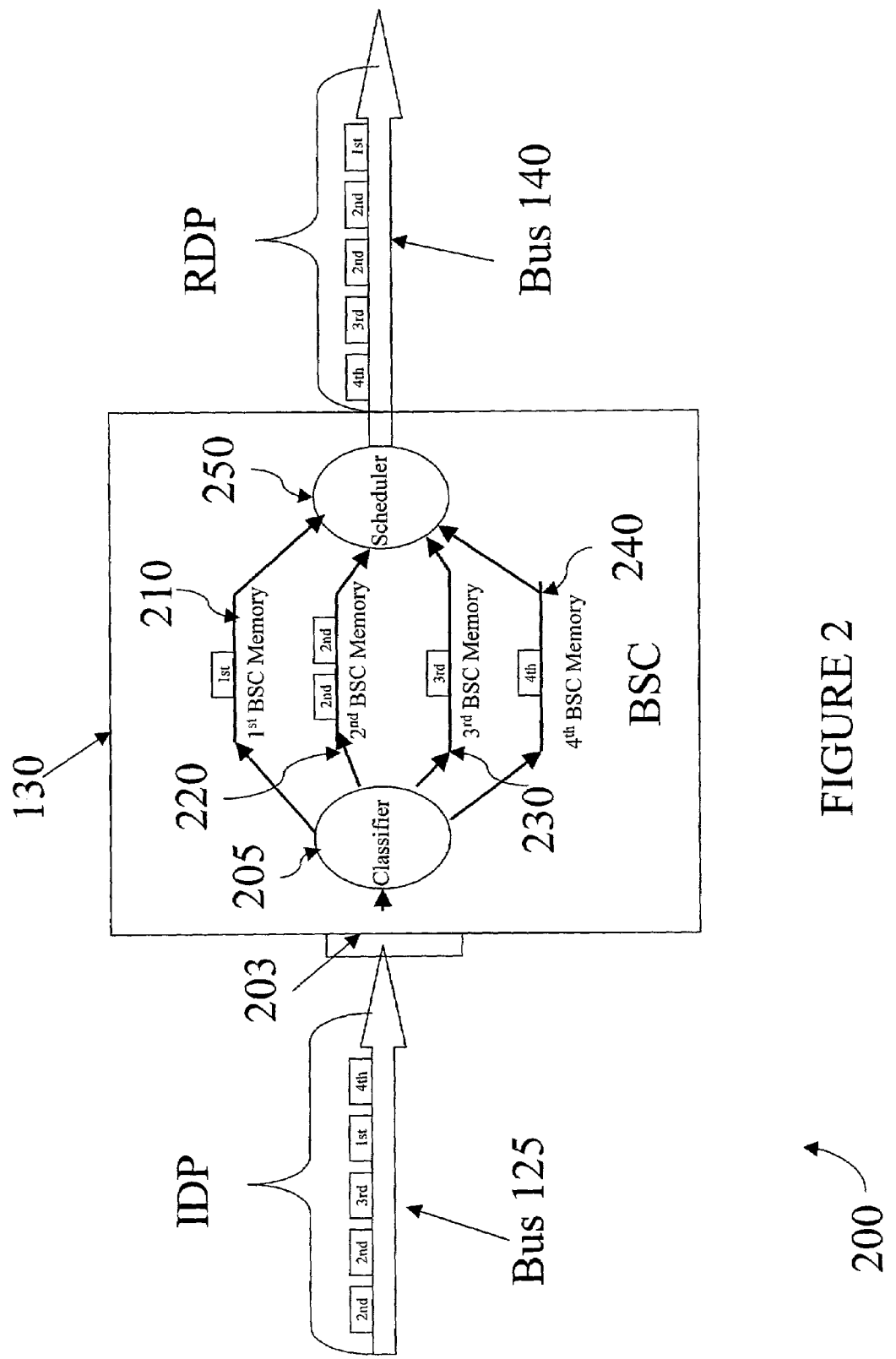
FIG. 2 schematically illustrates a BSC processing IDPs by priority as indicated by their outer DSCP markings.

Turning now to FIG. 2, illustrated is the BSC 130 constructed in accordance with the principles of the present invention. Generally, the BSC 130 classifies IDPs in according to their relative priority, as denoted by their respective outer DSCP markings, and then places the IDPs in the appropriate BSC memory. These IDPs are scheduled according to which BSC memory the IDP is in, according to a given algorithm. Then, the scheduled IDPs are removed of both the outer header and the GRE encapsulation, reformatted as RDPs and then transmitted. In a further embodiment, input flows and output flows comprise pluralities of IDPs and RDPs, respectively.

In the BSC 130, IDPs, with their corresponding DSCP markings, are received over the bus 125. These IDPs are illustrated in drawing 200 as members of input flows of the $4^{th}$, $1^{st}$, $3^{rd}$, $2^{nd}$, and another $2^{nd}$ priority. These input flows are then received by the BSC 130 through an interface 203. The interface 203 comprises both the A8 interface and the A9 interface. From the interface 203, the input flows, comprising IDPs, are transmitted to a classifier 205.

After receiving the IDPs through interface 203, the classifier 205 parses the associated outer DSCP markings and then, based upon these parsed outer DSCP markings, the classifier 205 places the IDPs in an appropriate BSC memory. IDPs with an outer DSCP of a first, or very high priority, are placed in a $1^{st}$ BSC memory 210. IDPs with an outer DSCP marking of a second, or high priority, are placed in a $2^{nd}$ BSC memory 220. IDPs with an outer DSCP marking of a third, or low priority, are placed in a $3^{rd}$ BSC memory 230. Finally, IDPs with an outer DSCP marking of a fourth, or very low priority, are placed in a $4^{th}$ BSC memory 240. In a further embodiment, an input flow comprises a plurality of IDPs. Therefore, input flows consequentially are also in the appropriate BSC memory.

Once the IDPs have been placed in the appropriate BSC memories 210, 220, 230, or 240 by the classifier 205, a scheduler 250 then schedules the IDPs by their corresponding BSC memory. In a further embodiment, the scheduling of the IDPs is a function of a queuing algorithm, such as weighted fair queuing ("WFQ") algorithm.

After the scheduler 250 has scheduled the IDPs, the BSC 130 strips both the outer IP header comprising the outer DSCP markings, and then a conversion from IDP into an RDP in RLP format then takes place in the BSC 130. The scheduled RDPs are then transmitted as an RLP instance by the BSC 130 to the BTS 150 through the bus 140.

Figure 3:
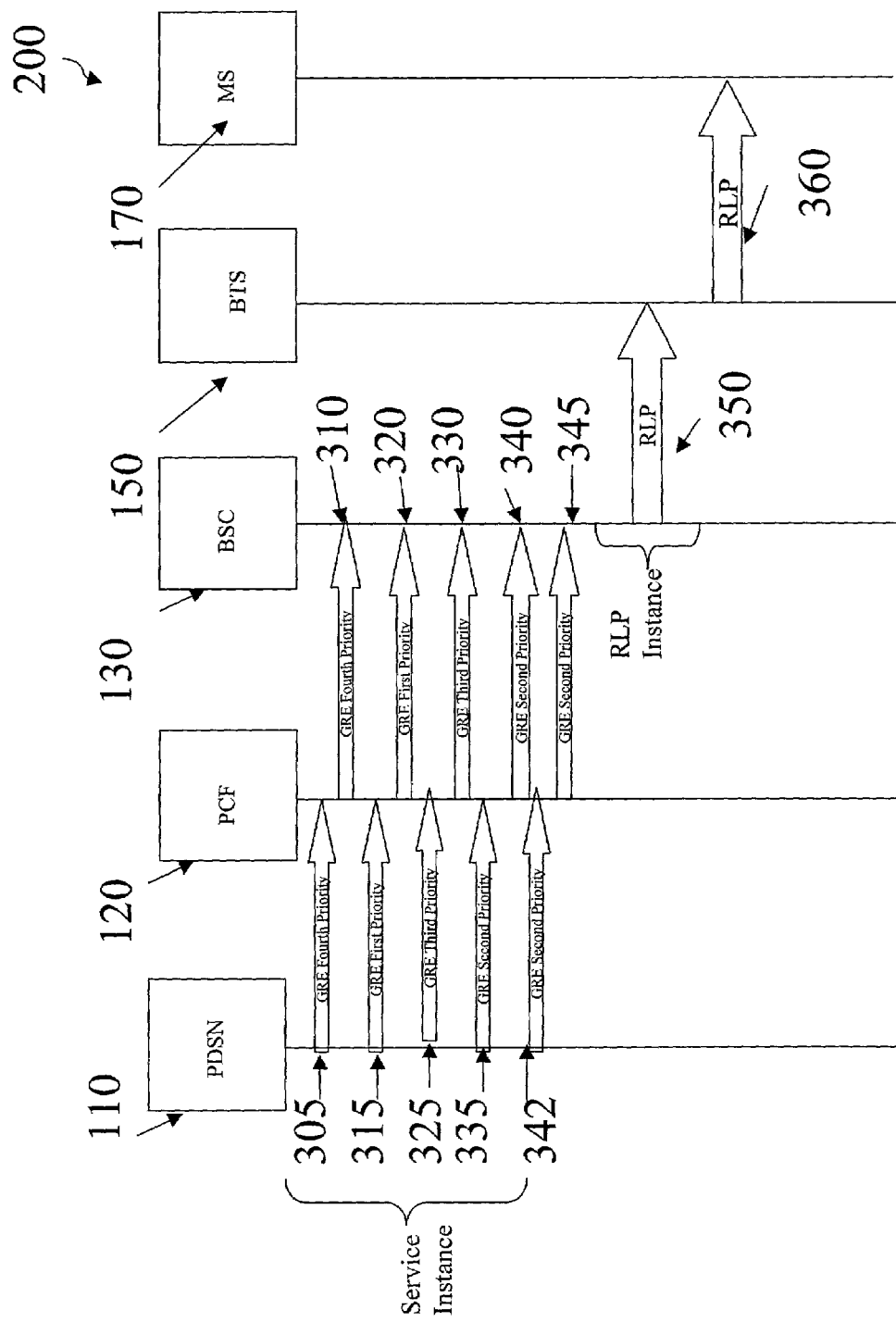
FIG. 3 is a Nodal Analysis diagram illustrating IDPs of an exemplary service instance being provided to a BSC, and the BSC classifying the IDPs of the exemplary service instance according to priority for transmission.

Disclosed in FIG. 3 is a Nodal Analysis diagram of an exemplary single service instance prioritized by the BSC 130 according of to the DSCP markings of the IDPs.

First, the PDSN 110 receives a number of IDPs in GRE format, all of which comprise a single service instance. Each outer DSCP marking associated with a given IDP has a nomenclature of "very high", "high", "low" and "very low". It is to be understood that the nomenclatures of "very high", "high", "low" and "very low" as detailed below, are employed for purposes of illustration only, and that other hierarchical organizations of the outer DSCPs are well within the scope of the present invention.

In the illustrated in FIG. 3, when the PDSN 110 receives IDPs of the exemplary service instance from the Internet, the IDPs are not received in the order specified by their associated inner DSCP markings. This is generally because the Internet is a packet-based system and therefore provides an individual routing path for a given IDP. Due to such factors as network conditions encountered by the given IDP, and so on, the order of IDPs received by the PDSN 110 of FIG. 3 does not correlate with their associated inner DSCP markings.

In FIG. 3, after receiving the IDPs, the PDSN 110 then transmits the IDPs to the PCF 120. Typically, the order in which the IDPs are received by the PCF 120 from the PDSN 110 is also the order the PCF 120 transmits the IDPs to the BSC 130, although other mappings are well within the present invention. The PDSN 110 encapsulates the IDP in GRE format, and copies the inner DSCP markings of the IDP onto at outer IP header as outer DSCP markings. The outer DSCP markings of the IDPs of FIG. 3 have dissimilar values, except for the two IDPs that have outer DSCP markings of "second" priority. The five IDPs, illustrated in FIG. 3, all are members of the same exemplary service instance. The resulting RDPs in RLP format are also all members of the corresponding RLP instance.

In data stream 305, the PCF 120 receives an IDP in GRE encapsulation from the PDSN 110. This IDP also has its own outer DSCP marking, that of "fourth" priority. This IDP was given or identified as a very low priority level before it arrived at the PDSN 110, as indicated by its inner DSCP marking. The PCF 120 then transmits this fourth priority IDP, in GRE encapsulation and with an outer IP header comprising an outer DSCP marking, to the BSC 130 in data stream 310.

In data stream 315, the PCF 120 receives an IDP in GRE encapsulation from the PDSN 110. This IDP also has its own outer DSCP marking, that of "first" priority. This IDP was given or identified as or very high priority level before it arrived at the PDSN 110, as indicated by its inner DSCP marking. The PCF 120 then transmits this first priority IDP, still in GRE encapsulation and with an outer IP header comprising an outer DSCP marking, to the BSC 130 in data stream 320.

In data stream 325, the PCF 120 receives an IDP in GRE encapsulation from the PDSN 110. This IDP also has its own corresponding DSCP marking, that of "third" priority. This IDP was given or identified as a third, or low, priority level before it arrived at the PDSN 110, as indicated by its inner DSCP marking. The PCF 120 then transmits this third priority IDP, still in GRE encapsulation and with an outer IP header comprising an outer DSCP marking, to the BSC 130 in data stream 330.

In data flow 335, the PCF 120 receives an IDP in GRE encapsulation from the PDSN 110. This IDP also has its own corresponding DSCP marking, that of "second" priority. That is, this IDP was given or identified as a high priority level before it arrived at the PDSN 110, as indicated by its inner DSCP marking. The PCF 120 then transmits this IDP, still in still in GRE encapsulation and with an outer IP header comprising an outer DSCP marking, to the BSC 130 in data stream 340.

Finally, in data stream 342, the PCF 120 receives an IDP in GRE encapsulation from the PDSN 110. This IDP also has its own corresponding DSCP marking, also that of "second" priority. That is, this IDP was given or identified as a high priority level before it arrived at the PDSN 110, as indicated by its inner DSCP marking. The PCF 120 then transmits this IDP, still in still in GRE encapsulation and with an outer IP header comprising an outer DSCP marking, to the BSC 130 in data stream 345.

The BSC 130 then classifies the received IDPs by the priority indicated by their corresponding outer DSCP markings, and places each IDP in an appropriate BSC memory. An appropriate BSC memory is generally defined as a memory associated with a particular outer DSCP marking. The BSC 130 then schedules the transmission of the IDPs to the BTS 150, according to such factors as to which BSC memory the IDP was in. Then, the BSC 130 strips off the outer IP header comprising the outer DSCP markings, strips off the GRE encapsulation, and converts the IDP into RDPs in RLP format.

In data stream 350, the BSC 130 first places the RDP corresponding to the first, or very high priority, IDP of data stream 320. The first-priority RDP of the data stream 350 comprises the same information as the first-priority IDP received by the BSC 130 in the data stream 320, but both the GRE header encapsulating the IDP and the outer IP header have been removed by the BSC 130, and the IDP has instead been converted to an RDP in RLP format.

In data stream 350, the BSC 130 next places the RDP corresponding to the second, or high priority, IDP of data stream 340. The second-priority RDP of the data stream 350 comprises the same information as the first-priority IDP received by the BSC 130 in the data stream 340, but both the GRE header encapsulating the IDP and the outer IP header have been removed, and the IDP has instead been converted to an RDP in RLP format.

In data stream 350, the BSC 130 next places another RDP corresponding to the second, or high priority, IDP of data stream 345. The second-priority RDP of the data stream 350 comprises the same information as the second-priority IDP received by the BSC 130 in the data stream 345, but both the GRE header encapsulating the IDP and the outer IP header have been removed, and the IDP has instead been converted to an RDP in RLP format.

In data stream 350, the BSC 130 next places the RDP corresponding to the third, or low priority, IDP of data stream 330. This third-priority RDP of the data stream 350 comprises the same information as the third-priority IDP received by the BSC 130 in the data stream 330, but both the GRE header encapsulating the IDP and the outer IP header have been removed, and the IDP has instead been converted to an RDP in RLP format.

Finally, in data stream 350, the BSC 130 places the RDP corresponding to the fourth, or very low priority, IDP of data stream 310. This fourth-priority RDP of the data stream 350 contains the same information as the fourth-priority IDP received by the BSC 130 in the data stream 310, but both the GRE header encapsulating the IDP and the outer IP header have been removed, and the IDP has instead been converted to an RDP in RLP format.

After the transmission of the RDPs of the data stream 350 to the BTS 150, the BTS 150 then transmits these RDPs as an RLP instance in the same order of priority as found within the data stream 350, to the MS 170 in data stream 360. The order of the transmission of the RDPs within the data stream 350 to the BTS 150 and the data stream 360 to the MS 170 reflects the priority of the outer DSCP markings of their corresponding IDPs. Classifying IDPs by priority indicated by their outer DSCP markings generally enables the BSC 130 to determine a more appropriate transmission order for the RDPs of a given RLP instance other than the order in which IDPs of the exemplary service instance were received.

Figure 4A:
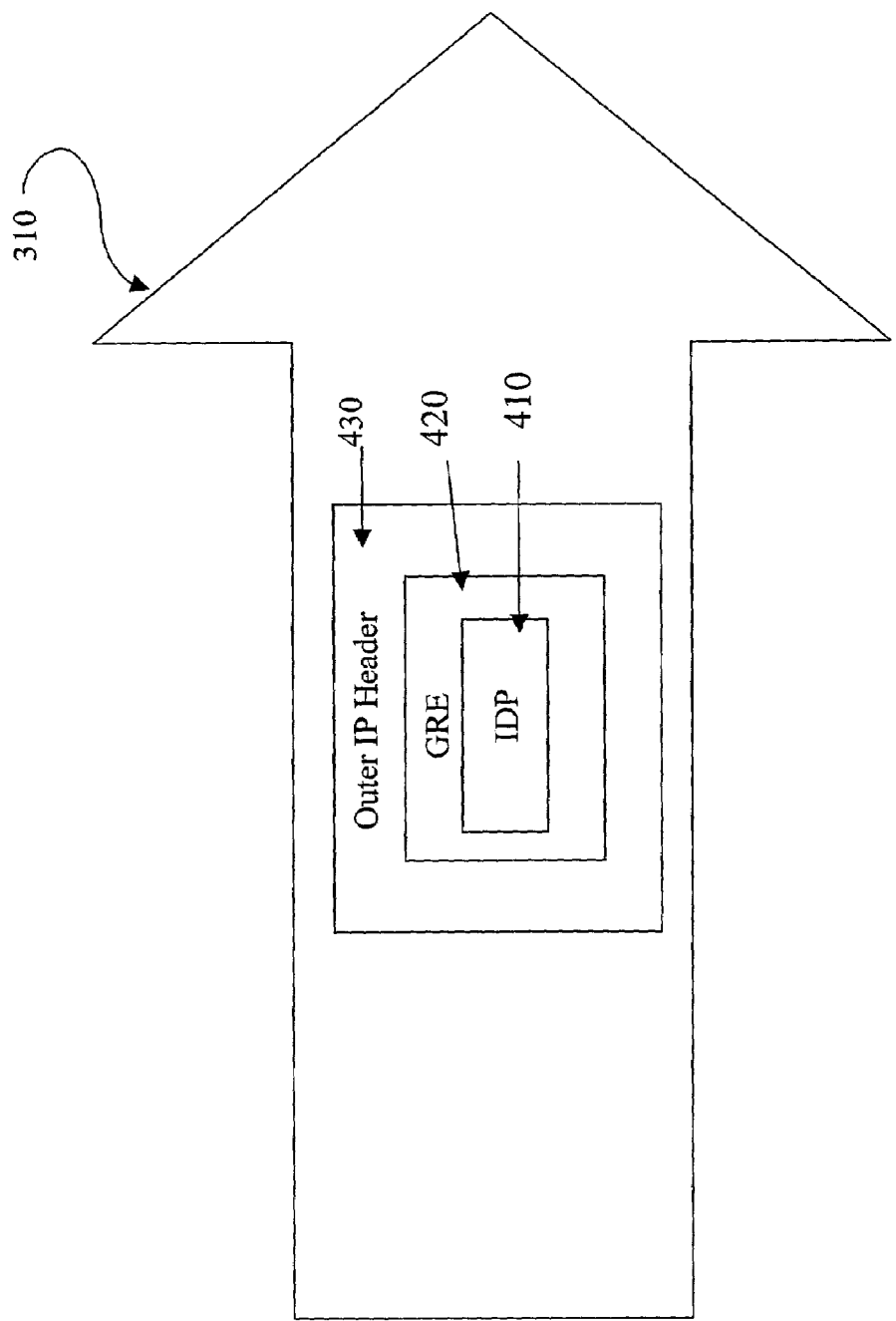
FIG. 4A depicts a GRE and an outer IP header encapsulating an IDP.

Turning briefly to FIG. 4A, depicted is a data packet of the date stream 310. Generally, in data stream 310, an IDP 410 is encapsulated in a GRE header 420. The GRE header 470 is in turn encapsulated in an outer IP header 430. The outer IP header 430 contains DSCP markings that indicate that the IDP has fourth, or low priority. The IDP 410, the GRE header 420, and the outer IP header 430 are all transmitted to the BSC 130 in the data stream 310. The BSC 130 then classifies and schedules the IDP 410 of the data stream 310 by the outer DSCP markings of the outer IP header 430.

Figure 4B:
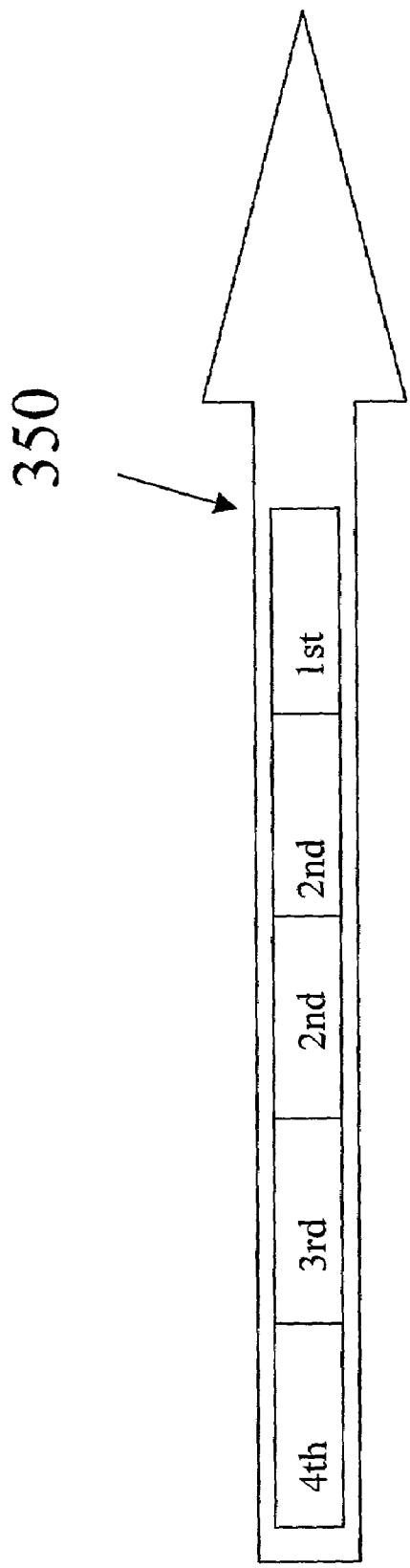
FIG. 4B depicts IDPs of an exemplary service instance prioritized according to their outer DSCP markings.

Turning briefly to FIG. 4B, depicted is a data stream 350 which is transmitted from the BSC 130 to the BTS 150. The data stream 350 comprises the information found within the IDPs of data streams 305, 315, 325, 335 and 342, but with the GRE headers and the outer IP header comprising outer DSCP markings removed. Instead, the IDPs of data streams 305, 315, 325, 335 and 342 are reformatted as RDPs in RLP format. The RDPs of FIG. 3 correspond to the an RLP instance.

Figure 5:
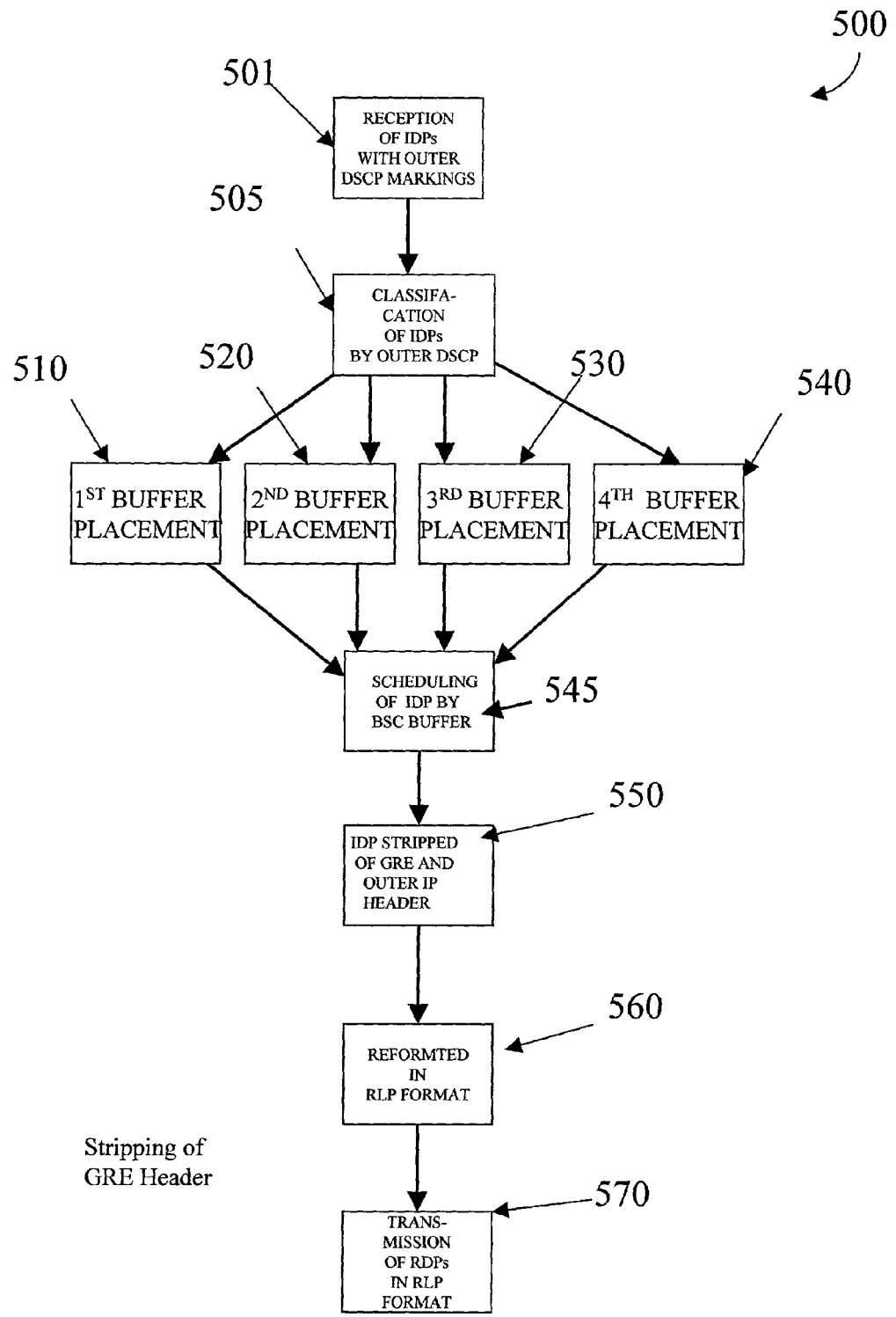
FIG. 5 illustrates a method classifying IDPs according to their outer DSCP markings, and then scheduling the IDPs for transmission.

FIG. 5 illustrates a method classifying IDPs according to their associated priority information as indicated by their associated outer DSCP markings, and the corresponding RDPs, in RLP format, are then scheduled for transmission.

In step 501, the BSC 130 receives an exemplary service instance comprising IDPs, encapsulated in GREs, and their corresponding outer DSCP markings. In step 505, the IDPs of the exemplary service instance are then classified by the BSC 130 according to their outer DSCP markings. After step 505, the BSC 130 then places the IDP in an appropriate BSC memory, as follows. If the outer DSCP marking of the given IDP is that of very high priority, the input flow will be placed in the first BSC memory in step 510. If the outer DSCP marking is high priority, the IDP will be placed in the second BSC memory in step 520. If the outer DSCP is low priority, the IDP will instead be placed in the third BSC memory in step 530. Finally, if the outer DSCP is very low priority, the IDP will be placed in the fourth BSC memory in step 540.

After the IDPs have been placed, according to priority, in the appropriate BSC memories in steps 510, 520, 530 or 540, in step 545, the method 500 schedules the IDPs as a function of the BSC memory to which each IDP has been assigned.

It step 550, the GRE header and the outer IP header of the IDPs are removed. Then in step 560, the method 500 converts the IDPs to RDPs in RLP format. Finally, in step 570, the method 500 transmits the RDPs, in RLP format, of the corresponding RLP instance to the BTS 150.

The method 500 also executes concurrently for a plurality of distinct service instances. In other words, the BSC 130 concurrently processes IDPs corresponding to a plurality of service instances. In this further embodiment, IDPs associated with the same service instance are grouped together, by way of a GRE key. That is, all flows of the same service instance are given the same GRE key number by the PDSN 110, and different service instances have different keys. Therefore, the BSC 130 can sort by GRE key to determine membership in a given service instance. Then, within each separate service instance, the IDPs are sorted by priority, as indicated by their respective outer DSCP markings, and placed in the appropriate BSC memory for scheduling. These separate service instances are processed independently from one another.

It is understood that the present invention can take many forms and embodiments. Accordingly, several variations may be made in the foregoing without departing from the spirit or the scope of the invention. For example, different over-the-air communications standards may be implemented, and the like.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

What is claimed is:

1. A base station controller, comprising:
a classifier for classifying one or more Internet data packets according to a corresponding DSCP marking of the one or more Internet data packets, wherein the classifier places the one or more Internet data packets in a corresponding base station controller memory; and
the corresponding base station controller memory is associated with the DSCP marking,
wherein the associated DSCP marking of the Internet data packets corresponds to a per hop behavior.

2. A method of ordering an Internet data packet within a base station controller, comprising:
receiving an Internet data packet and its associated outer DSCP marking;
classifying the Internet data packet according to its associated DSCP marking; and
placing the Internet data packet in a corresponding base station controller memory,
wherein the associated outer DSCP marking of the Internet data packet corresponds to a per hop behavior.

3. A system for wireless communication, comprising:
A base station controller, comprising:
a classifier for classifying one or more Internet data packets according to a corresponding DSCP marking of the one or more Internet data packets, wherein the corresponding DSCP marking comprises an outer DSCP marking and an inner DSCP marking, wherein the classifier places the Internet data packet in a corresponding base station controller memory, wherein the corresponding base station controller memory is associated with the outer DSCP marking and the outer DSCP marking is a copy of the inner DSCP marking; and a packet data switching node, wherein the packet data switching node at least creates the outer DSCP markings of the one or more Internet data packets.

4. The system of claim 3, wherein the packet data switching node receives Internet data packets, encapsulated in a general routing encapsulation header, from the base station controller.

5. The system of claim 3, wherein the packet data switching node encapsulates the Internet data packets in a general routing encapsulation header.

6. A base station controller, comprising:
a classifier for classifying one or more Internet data packets according to a corresponding indicia of the one or more Internet data packets, wherein the indicia comprises a copy of at least a part of the header of the one or more Internet data packets, wherein the classifier places the one or more Internet data packets in a corresponding base station controller memory; and the corresponding base station controller memory is associated with the indicia wherein the indicia is an outer DSCP marking.

7. The base station controller of claim 6, wherein the base station controller memory is a base station controller buffer.

8. The base station controller of claim 6, wherein the outer DSCP marking is a copy of a corresponding inner DSCP marking.

* * * * *